(12) United States Patent
Arimoto et al.

(10) Patent No.: US 9,790,728 B2
(45) Date of Patent: Oct. 17, 2017

(54) SINGLE-RAIL WINDOW REGULATOR ASSEMBLY

(71) Applicant: Hi-Lex Controls, Inc., Rochester Hills, MI (US)

(72) Inventors: Shigeki Arimoto, Bloomfield Hills, MI (US); Masayuki Matsushita, Rochester Hills, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 0 days.

(21) Appl. No.: 14/802,068

(22) Filed: Jul. 17, 2015

(65) Prior Publication Data

US 2017/0016265 A1    Jan. 19, 2017

(51) Int. Cl.
| | |
|---|---|
| *E05F 15/689* | (2015.01) |
| *B60J 1/17* | (2006.01) |
| *B60J 5/04* | (2006.01) |
| *E05F 11/48* | (2006.01) |
| *E05F 11/38* | (2006.01) |

(52) U.S. Cl.
CPC .............. *E05F 15/689* (2015.01); *B60J 1/17* (2013.01); *B60J 5/0402* (2013.01); *B60J 5/0419* (2013.01); *E05F 11/486* (2013.01); *E05F 11/488* (2013.01); *E05F 11/385* (2013.01); *E05F 11/485* (2013.01)

(58) Field of Classification Search
CPC .............................. E05F 15/689; E05F 11/488
See application file for complete search history.

(56) References Cited

U.S. PATENT DOCUMENTS

| | | | | | |
|---|---|---|---|---|---|
| 4,246,726 | A | * | 1/1981 | Breaz ..................... | E05F 11/382 49/227 |
| 4,878,391 | A | * | 11/1989 | Komatsu ............... | E05F 11/485 49/352 |
| 5,673,515 | A | * | 10/1997 | Weber ................... | E05F 11/385 49/140 |
| 5,992,099 | A | * | 11/1999 | Thomas ................ | E05F 11/385 49/375 |
| 6,006,473 | A | * | 12/1999 | Mariel .................. | E05F 11/426 49/139 |

(Continued)

FOREIGN PATENT DOCUMENTS

| | | |
|---|---|---|
| EP | 1 617 029 A1 | 1/2006 |
| JP | 9-228734 A | 9/1997 |

*Primary Examiner* — Katherine Mitchell
*Assistant Examiner* — Catherine A Kelly
(74) *Attorney, Agent, or Firm* — Brinks Gilson & Lione

(57) ABSTRACT

A single-rail window regulator for moving a side window of a vehicle in an upward direction and in a downward direction includes a guide rail defining and a carrier plate having a central guide structure for movably engaging the guide rail, a first lateral extension extending to a first lateral side of the guide rail, and a second lateral extension extending to a second lateral side of the guide rail body opposite the first lateral side. The carrier plate has a first cable attachment pocket on the first lateral extension and a second cable attachment pocket on the second lateral extension. Accordingly, the two attachment pockets are arranged on opposite lateral sides. As one cable end pulls the carrier plate upward and the other cable end pulls the carrier plate downward, the arrangement causes torques in the same rotational direction, even when reversing the direction of movement.

9 Claims, 5 Drawing Sheets

(56) References Cited

U.S. PATENT DOCUMENTS

| | | | |
|---|---|---|---|
| 6,874,279 B1 * | 4/2005 | Weber | B60J 5/0416 |
| | | | 49/348 |
| 7,424,788 B2 * | 9/2008 | Kirejczyk | E05F 11/483 |
| | | | 49/352 |
| 7,596,907 B2 * | 10/2009 | Huge | E05F 11/486 |
| | | | 49/348 |
| 7,726,074 B2 * | 6/2010 | Kollner | E05F 11/488 |
| | | | 49/348 |
| 7,908,795 B2 | 3/2011 | Arimoto | |
| 8,240,086 B2 * | 8/2012 | Mangold | E05F 11/385 |
| | | | 49/375 |

* cited by examiner

SINGLE-RAIL WINDOW REGULATOR ASSEMBLY

TECHNICAL FIELD

The present application relates to window regulators for automotive vehicles. In particular, the present application relates to a linear single-rail window regulator for a side window of a vehicle.

BACKGROUND

Passenger car motor vehicles have for many decades featured movable side door glass. A mechanism is required in order to move the glass between the upper closed position and the lower opened position. These mechanisms are generally known as window regulators. Window regulators can be manually operated by, or can be driven by a powered actuator, most commonly an electric motor. One type of window regulator uses a pulley arrangement using a metal cable wrapped around a drum driven by an electric motor. This device uses a carrier which engages the door glass and fastens it to the window regulator assembly to control its motion as it moves vertically.

Window regulator mechanisms can still be categorized into a group which includes dual rail and single rail types. In a dual rail system, a pair of separated rails is provided which each include a movable window clamp which is fastened to the lower edge of the glass and move in a synchronized manner to raise and lower the glass. In a single rail type, a single rail is positioned near the center of the glass panel and includes a carrier plate with a clamp assembly which engages a lower portion of the window. The carrier plate with the clamp assembly moves the window vertically along the rail between the open and closed positions. A single-rail window regulator requires fewer parts than a dual rail system, but it poses design challenges in providing sufficient stability for the control of the glass motion since it is controlled by a single rail and a single carrier plate.

For example, typical single-rail window regulators need to provide a very close fit between the carrier plate and the guide rail to reduce an angular tilt of the carrier plate in order to overcome the torque created by friction between the glass panel and the window frame, in which the glass panel is guided. Thus, the carrier plate needs to be rigid and tightly guided on the single guide rail. This requires a high material strength of the carrier plate and a firm securement of the clamp assembly to the glass panel.

If the necessary high precision and strength of the connection between the carrier plate and the guide rail is not met or is reduced due to wear, such an arrangement affects the quality of the glass guidance system and may on occasion cause undesirable noise.

SUMMARY

The purpose of this invention is to provide a single-rail window regulator that overcomes the noise and stability issues of known window regulators.

Applicants discovered that a significant improvement can be achieved by single-rail window regulator for moving a side window of a vehicle in an upward direction and in a downward direction along a rail axis that includes a guide rail defining the rail axis and a carrier plate having a central guide structure for movably engaging the guide rail, a first lateral extension extending to a first lateral side of the guide rail, and a second lateral extension extending to a second lateral side of the guide rail body opposite the first lateral side, the carrier plate having a first cable attachment pocket on the first lateral extension and a second cable attachment pocket on the second lateral extension. Accordingly, the two attachment pockets are arranged on opposite sides of the guide rail. As one cable end pulls the carrier plate upward on one side of the guide rail and the other cable end pulls the carrier plate downward on the other side of the guide rail, the opposite cable ends cause a torque in the same rotational direction, regardless of the direction of movement, thus eliminating a rocking movement of the carrier plate when reversing the direction of movement. A drive unit arranged at the bottom of the guide rail provides compact packaging of the window regulator assembly.

For example, the first cable attachment pocket may be configured for receiving a cable end of a cable extending in the upward direction from the carrier plate and the second cable attachment pocket is configured for receiving a cable end of the cable extending in the downward direction from the carrier plate.

The first lateral side of the carrier plate in preferably located toward a side of the guide rail where the glass panel has a longer vertical edge than on the opposite side and where the glass panel experiences more friction.

The window regulator further includes a first window clamp on the first lateral extension and a second window clamp on the second lateral extension of the carrier plate, the first and second window clamps configured to engage with a lower portion of the side window. Due to the arrangement of the cable pockets, the first window clamp merely needs to support the glass panel of the side window so that the second window clamp may provide a more secure engagement with the lower portion of the side window than the first window clamp. For example, the first window clamp may be a plastic clip, and the second window clamp may be at least reinforced with metal.

For reducing vibration of the cable, the guide rail may include a cable channel extending along the rail axis and accommodating an intermediate portion of the cable extending along the guide rail between the first cable end and the second cable end.

The cable ends may be provided with elastic tension adjusters for automatic compensation of slack in the cable.

By arranging three portions of the cable parallel to one another, a particularly space-saving window regulator assembly can be realized.

Further details and benefits will become evident from the following description of preferred embodiments illustrated by the accompanying drawings. The drawings are provided for purely illustrative purposes and are not intended to limit the scope of the present invention.

DETAILED DESCRIPTION OF THE DRAWINGS

In the following description, the term "upward" designates a direction of movement against the force of gravity. The term is not limited to a vertical direction exactly parallel the gravitational force vector, but includes any direction that increases the height of a side window, including movements along sloped angles. In analogy, the term "downward" encompasses all directions opposite to the upward direction. The term "lateral' is used with respect to the guide rail axis, which may be arranged at a slope relative to the gravitational force so that the lateral direction may likewise be sloped relative to a horizontal line.

Figure 9:
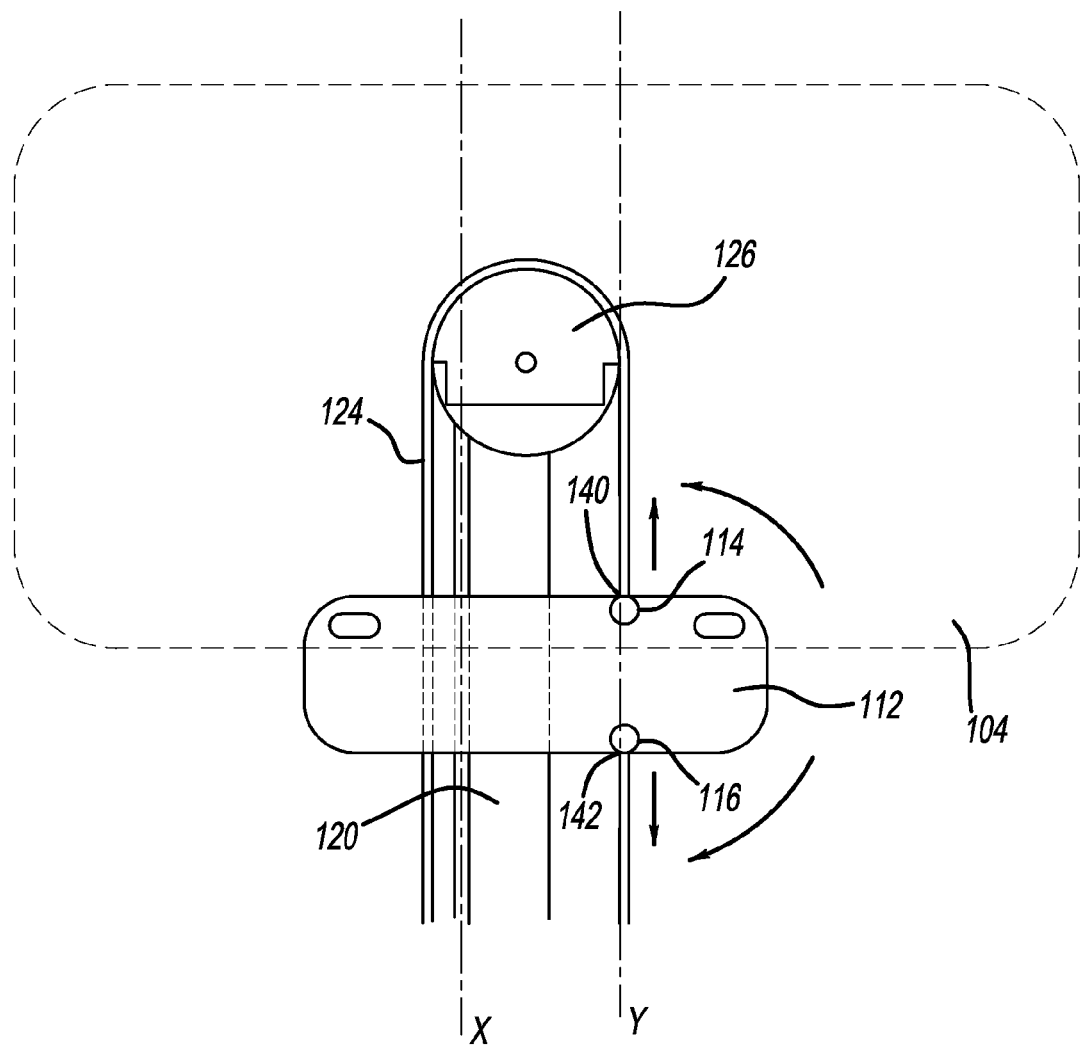
FIG. 9 schematically shows a single-rail window regulator assembly operating under principles known from the prior art.

FIG. 9 schematically illustrates the principle of operation of known single-rail window regulators 110. A carrier plate 112 is slidingly guided on a guide rail 120 that defines a rail axis X. On opposite lateral sides, the carrier plate is attached to a glass panel 104 of a side window. The carrier plate 112 includes two cable pockets 114 and 116 aligned along a line Y parallel to the guide rail axis X and laterally offset therefrom. A first carrier pocket 114 accommodates a first cable end 140, from which the cable 124 extends upward, and a second carrier pocket 116 axially opposite the first cable pocket 114 accommodates a second cable end 142, from which the cable 124 extends downward. At the top end of the guide rail 120, a first pulley 126 deflects the cable 124 from the first cable pocket 114 on a first lateral side of the guide rail 120 in a U-turn to a second, opposite lateral side of the guide rail 120, where the cable extends downward to the bottom end of the guide rail 120. At the bottom end of the guide rail (not shown) is a second pulley deflecting the cable in a further U-turn from the second lateral side of the guide rail back to the first lateral side of the guide rail toward the carrier plate 112, where the second cable end 142 is attached to the carrier plate 112 in the second cable pocket 116.

A drive unit that engages the cable for moving the cable 124 is arranged near the second pulley. As the drive unit moves the cable clockwise or counterclockwise around thru first and second pulleys, the carrier plate experiences a torque in the same clockwise or counterclockwise direction due to the lateral offset of the cable pockets 114 and 116 from the rail axis X. Accordingly, the rotational direction of the torque changes when the window regulator changes its direction from an upward movement (here: counterclockwise) to a downward direction (here: clockwise) and vice versa. Even if the cable pockets 114 and 116 were centrally arranged with the rail axis X, friction of the glass panel 104 in run channels of the vehicle door may cause a torque due to friction acting along side edges of the glass (and at other contacts between the glass panel and body structure elements).

The combined sources of torque mentioned above may result in instability of the glass panel 104 because these sources of torque act in opposing directions so that the amount and direction of a total torque at a given time depends on the source exerting the greatest torque on the assembly at this time. The resulting alternating torque acting on the glass panel 104 may cause undesired noise and uneven movement of the window.

In order to withstand the forces acting on the glass panel, the carrier plate requires a firm attachment to the glass panel on both lateral sides. Further, the carrier plate must be tightly fitted to the guide rail for ensuring a smooth upward and downward movement without excessive friction and noises caused by torque transmitted to the glass panel. Accordingly, manufacturing tolerances must be kept relatively small.

As shown in FIGS. 1 through 4, the present application instead discloses a single-rail window regulator assembly 10 with a carrier plate 12, in which cable pockets 14 and 16 are arranged on opposite lateral extensions 18 and 22 of the carrier plate 12 on opposite sides of the guide rail 20.

Figure 1:
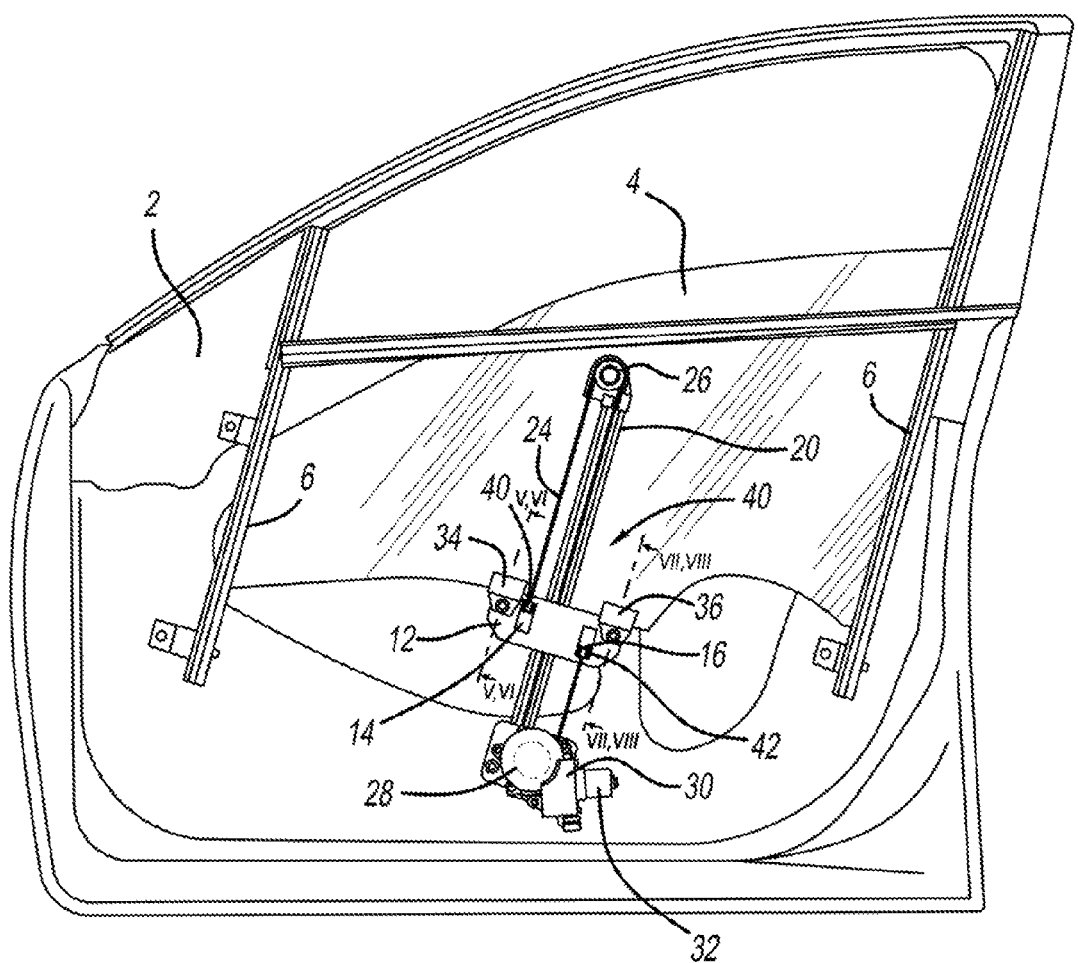
FIG. 1 is a cut-away view of a vehicle door assembly with a side window controlled by a first embodiment of a single-rail window regulator assembly according to one aspect of the present invention.

Now referring to FIG. 1, an automotive door 2 is shown in a cut-away view revealing a glass panel 4 of a movable side window and the single-rail window regulator assembly 10. The term "glass" in this context includes any suitable transparent material, for example silica glass or other glazing materials such as polycarbonate.

The window regulator assembly 10 shown in FIG. 1 includes the guide rail 20 defining a rail axis X (see FIG. 2), the window carrier plate 12, a drive cable 24, a first cable deflector 26 near the top of the guide rail 20, a second cable deflector 28 near the bottom of the guide rail 20, and a drive unit 30. The cable deflectors 26 and 28 may be in the form of pulleys or low-friction U-shaped sliding grooves. The drive unit 30 includes an electric motor 32 that reversibly drives the cable near the bottom cable deflector in the embodiment shown in FIGS. 1-3. The invention is, however, not limited to window regulator assemblies driven by a motor. The principles described in the present application are equally applicable to manually raised and lowered windows.

The carrier plate 12 coupled to the cable 24 is moved by the cable 24 and in turn moves the glass panel 4 upward or downward along laterally arranged run channels 6 that are part of a window frame in the vehicle door 2. FIG. 1 illustrates the glass panel 4 in an intermediate position between its lowered-opened and raised-closed positions.

The carrier plate 12 is preferably formed from an injection molded polymeric material which can be cost-effectively produced. The carrier plate 12 includes the first cable pocket 14 and the second cable pocket 16 formed in the first and second lateral extensions 18 and 22 extending on opposite lateral sides of the guide rail 20. A first window clamp 34 and a second window clamp 36 are affixed to the carrier plate 12 near opposite lateral ends of the lateral extensions 18 and 22. The window clamps 34 and 36 (see FIG. 1) hold the glass panel at a height determined by the position of the carrier plate 12. The carrier plate 12 further forms a vertically extending guide structure 38 best seen in FIG. 3. The guide rail 20 engages the guide structure 38 on the carrier plate 12 to allow the carrier plate 12 to move along the rail axis X.

Figure 2:
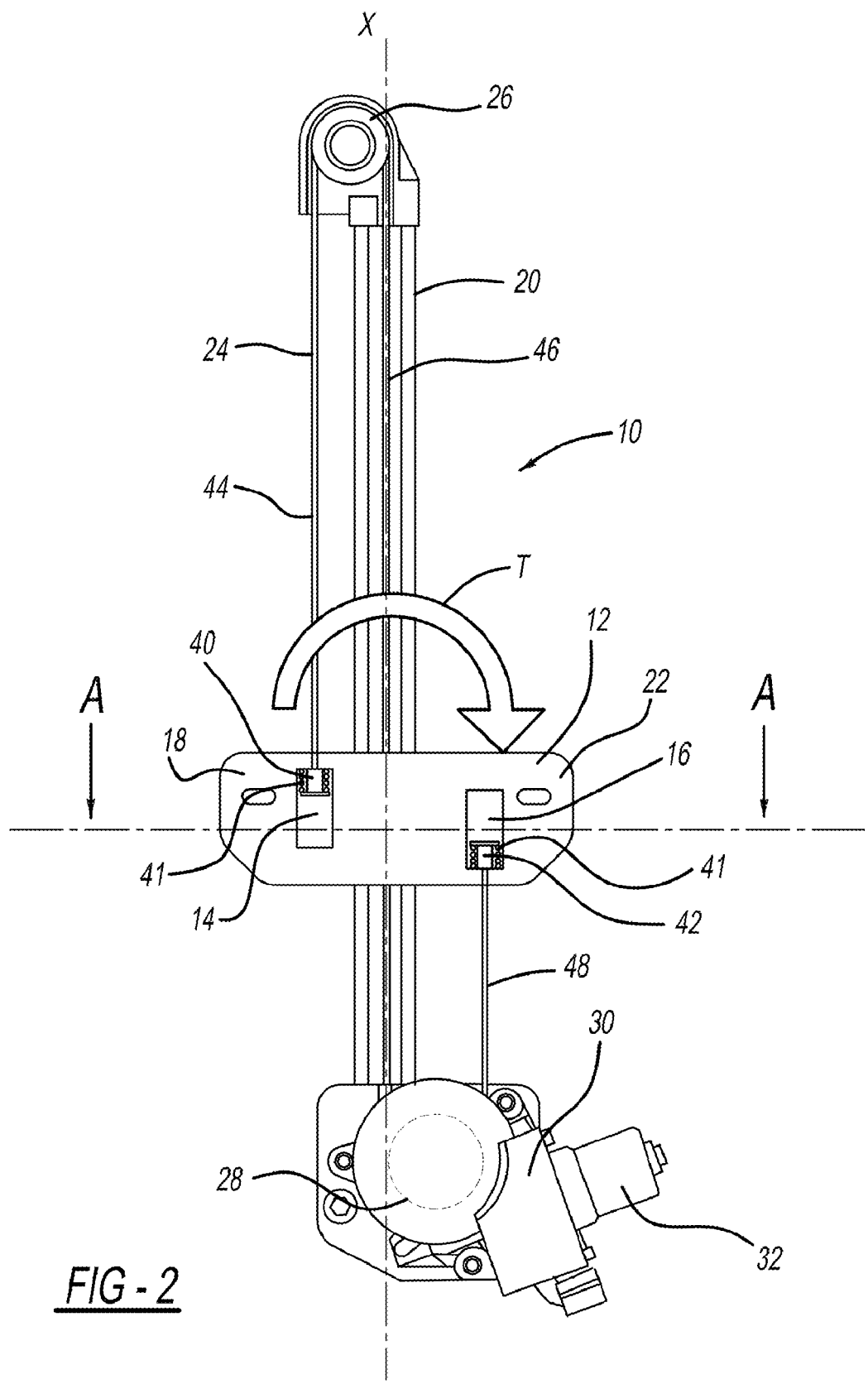
FIG. 2 shows the window regulator assembly of FIG. 1 in greater detail.

FIG. 2 shows an enlarged view of the window regulator assembly 10 of FIG. 1, in which the window clamps 34 and 36 and the glass panel 4 are omitted for simplicity. The first cable pocket 14 in the first lateral extension 18 on the left side of the guide rail 20 in FIG. 2 accommodates a first cable end 40, from which the cable 24 extends upward, and the second cable pocket 16 in the second lateral extension 22 on the right side of the guide rail 20 in FIG. 2 accommodates a second cable end 42, from which the cable 24 extends downward. Each of the first and second cable ends 40 and 42 includes an elastic element 41 providing an automatic tension adjustment of the cable. The elastic elements bias the cable ends 40 and 42 into the cable pockets so as to compensate any slack in the cable that may be due to manufacturing tolerances or that may build up over time. The elastic elements thus prevent that the cable ends 40 and 42 could slip out of their respective cable pockets 14 and 16. In the shown embodiment, the elastic elements are shown as compression springs. They may also include further adjustment features, such as ratchets for a permanent absorption of an increasing cable length over time.

The cable 24 describes an S-shaped path defined by an upward leg 44 from the first cable pocket 14 to the first cable deflector 26, an intermediate portion 46 from the first cable deflector 26 through a cable channel 50 in the guide rail 20 to the second cable deflector 28, and a further upward leg 48 from the second cable deflector 28 to the second cable pocket 16. Depending on the structure of the drive unit 30, the cable 20 may be arranged in a loop inside the drive unit 30, which does not affect the generally S-shaped configuration forming a functional feature of the shown embodiment of the window regulator assembly 10. The upward leg 44, the intermediate portion 46 extending downward through the cable channel 50, and the further upward leg 48 all extend parallel to the direction of the guide rail 20 and are only spaced apart from each other by the diameters of the first and second cable deflectors 26 and 28, respectively. With the drive unit arranged adjacent to the bottom end of the guide rail 20, the shown arrangement is particularly compact and requires little lateral space.

Single-rail window regulators 10 place the cable 24 under high tension when the carrier plate 12 is in its uppermost position corresponding to a sealingly shut side window. Under this high tension, the central intermediate portion 46 of the cable 24 may act like a guitar string in a moving vehicle and may create a "twang" sound due to vibration. As shown especially in FIG. 3, the intermediate portion 46 of the cable 24 is guided inside the cable channel 50 formed by the guide rail 20 and by the carrier plate 12, limiting a lateral movement of the intermediate cable portion 46. Accordingly, any lateral vibration is greatly reduced because the amplitude of the vibration is limited by the lateral width of the cable channel 50. The width of the cable channel 50 is preferably wide enough not to pinch the cable 24 or to cause undue friction, but narrow enough to effectively reduce the lateral vibration of the cable 24 when the glass pane 4 is in its uppermost position.

Figure 3:
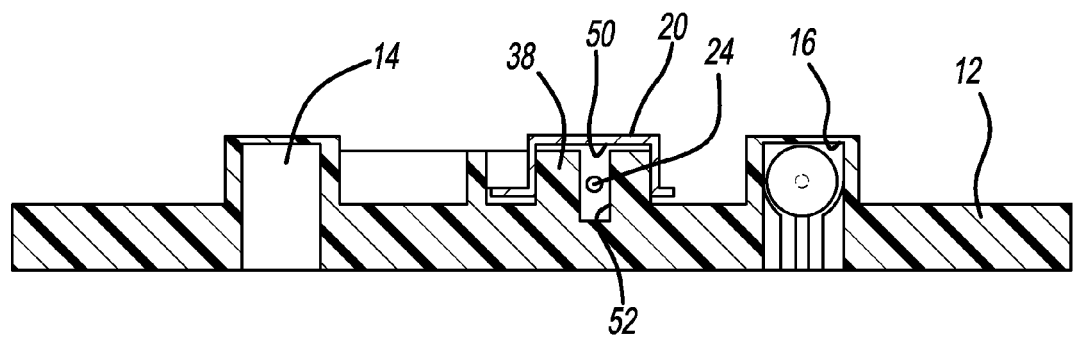
FIG. 3 shows a cross-section of the window regulator assembly of FIG. 2 along the line A-A.

While the embodiment of FIG. 3 shows lateral walls 52 of the carrier plate 12 further narrowing the cable channel 50, the guide rail itself may have instead have similarly narrow side walls delimiting the cable channel 50 in order to provide the limited width of the cable channel 50 over the entire length of the guide rail 20.

Figure 4:
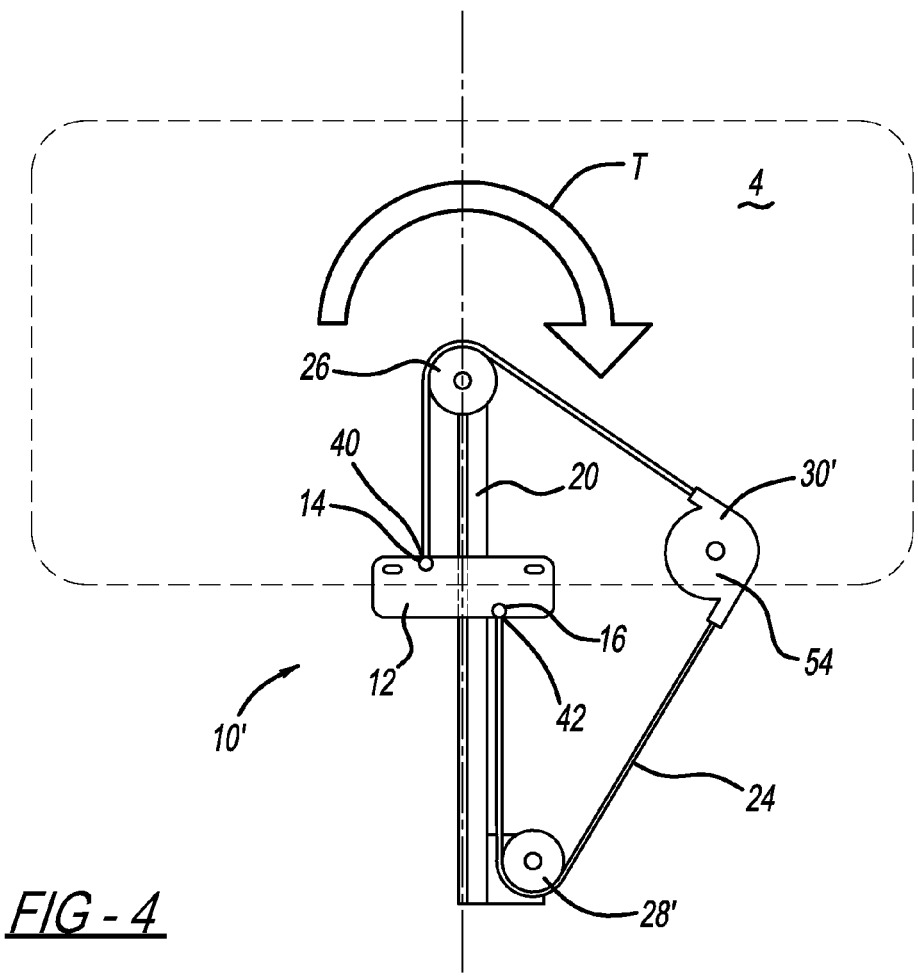
FIG. 4 shows a second embodiment of a single-rail window regulator assembly according to another aspect of the present invention.

FIG. 4 shows an alternative embodiment, in which the drive unit 30' is positioned laterally offset from the guide rail 20 at a height between the first and second cable deflectors 26 and 28'. In this embodiment, the intermediate portion 46' of the cable 24 is supported by a third cable deflector 54 forming a part of the drive unit 30' so that the cable 24 is less likely to generate the twang sound because the intermediate length is further divided into two legs.

The principle of the cable pockets 14 and 16 being attached to opposite lateral extensions 18 and 22 of the carrier plate 12 in FIG. 4 is analogous to the embodiment of FIGS. 1-3. Because the drive unit 30' is arranged on a lateral side, however, the second cable deflector 28' is offset laterally farther from the rail axis X than the second cable deflector 28 of the embodiment of FIGS. 1-3. The second cable deflector 28' deflects the cable away from the rail axis X toward the offset drive unit 30'.

Both described embodiments of window regulator assemblies 10 and 10' provide that the cable 24 exerts a torque on the carrier plate 12 in the same rotational direction with respect to the engagement between the carrier plate 12 and the guide rail 20, regardless of the direction of movement of the glass panel 4. The direction of movement is determined by the greater one of the two pulling forces exerted by cable ends 40 and 42, respectively resulting in a vector sum that points upward or downward.

Due to manufacturing tolerances, the engagement between the guide structure 38 of the carrier plate 12 and the guide rail 20 may allow for a slight tilt about an axis perpendicular to the plane of the glass pane 4. When the carrier plate 12 is lowered by shortening the cable portion 48 extending downward from the second cable end 42 anchored in the second cable pocket 16, the torque exerted on the carrier plate 12 is oriented in a clockwise direction as indicated by an arrow T. Conversely, when the carrier plate 12 is raised by shortening the cable portion 44 extending upward from the first cable end 40 anchored in the first cable pocket 14, the torque exerted on the carrier plate 12 is also oriented in the clockwise direction indicated by the same arrow T. Because the cable tension is tight, the cable tension does not allow the carrier plate 12 to rotate in the direction opposite to the arrow T. The torque generated by the carrier plate 12 is greater than any opposing torque caused by friction between the glass panel 4 and the run channels 6 of the window frame.

Preferably, the bias exerted by the cable 24 urges the second lateral extension facing the rear of the vehicle downward because the rear edge of the glass panel 4 has a longer edge running in the respective run channel 6 as visible in FIG. 1. For a rear side window, however, where the front edge of the glass panel is longer, the cable bias may preferably urge the front downward and the rear upward.

In effect, the new concept provides that not only a tight fit and strength of the carrier plate 12 provides directional stability, but the cable tension also helps to reduce the angular movement by providing a unidirectional bias in all directions of movement in contrast to opposite bias directions depending on the direction of movement known from the prior art. While the glass panel 4 may generate friction in the run channels 6 that generates an alternating net torque, the torque exerted by the carrier plate due to the forces applied by the cable 24 is dimensioned to generate a total torque in the direction of arrow T. This increased stability supported by the cable 24 allows to reduce the lateral size of the carrier plate 12 and to improve packaging conditions.

Figure 5:
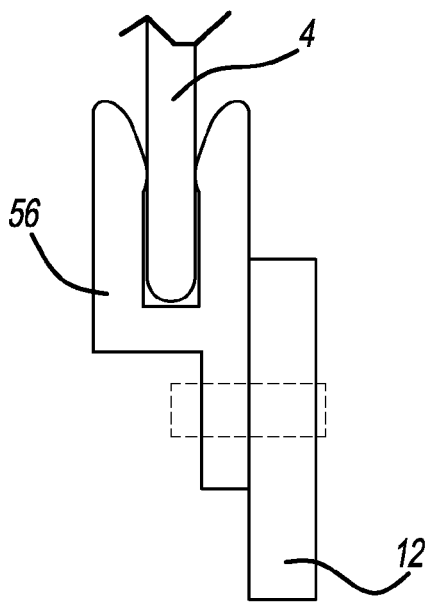
FIG. 5 shows a first embodiment of a window clamp suited for both the first and second embodiment of the widow regulator assembly in cross-sectional view V shown in FIG. 1.
Figure 6:
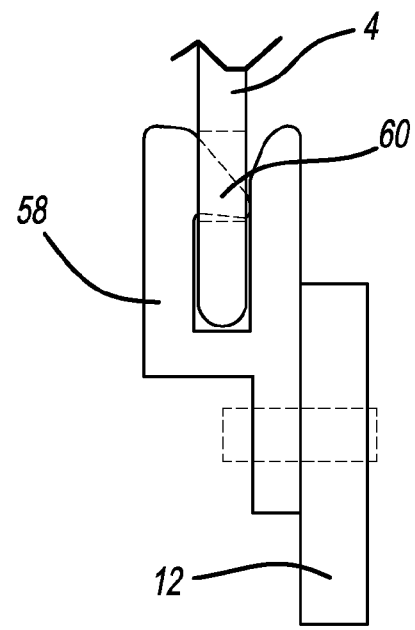
FIG. 6 shows a second embodiment of a window clamp suited for both the first and second embodiment of the widow regulator assembly in cross-sectional view VI shown in FIG. 1.

The effect of biasing the glass panel 4 in the same rotational direction regardless of the direction of the carrier plate 12 movement provides an additional cost benefit. Only one of the two window clamps 36 requires a sturdy and secure attachment for pulling the glass panel 4 downward during a downward movement, while the other window clamp 34 generally only needs to support the weight of the class panel 4 for an upward movement. Because the torque exerted on the carrier plate 12 by the cable 24 always acts in the same direction, only the second window clamp 36 on the side of the second cable pocket 16, from which the cable 24 extends downward, needs to be able to pull the glass panel 4 downward. As the side of the first cable pocket 14 is pushed against the glass panel 4 during both upward and downward movements, and because gravity urges the glass panel 4 toward the first window clamp 34, the first window clamp 34 merely needs to hold the class panel 4 in position by supporting the weight of the glass panel 4 without exerting high forces on the glass panel 4. Thus, the first window clamp 34 may be a plastic clip 56 that merely cradles the glass panel as shown in FIG. 5. If the glass panel 4 has a hole near the bottom edge, the plastic clip 58 may have a resilient nose 60 snapping into the hole of the glass panel as shown in FIG. 6.

Figure 7:
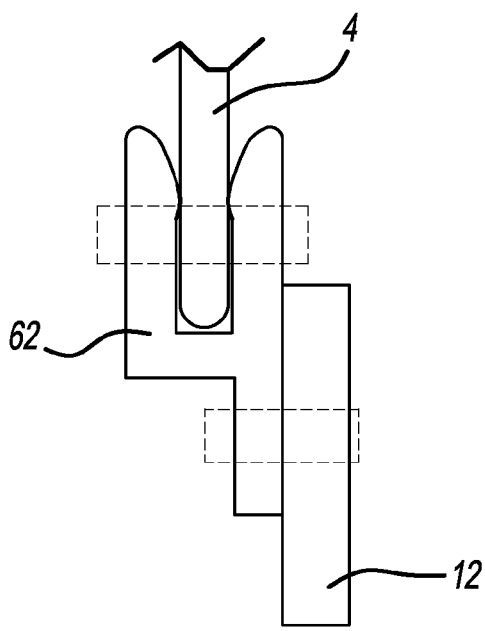
FIG. 7 shows a third embodiment of a window clamp suited for both the first and second embodiment of the widow regulator assembly in cross-sectional view VII shown in FIG. 1.
Figure 8:
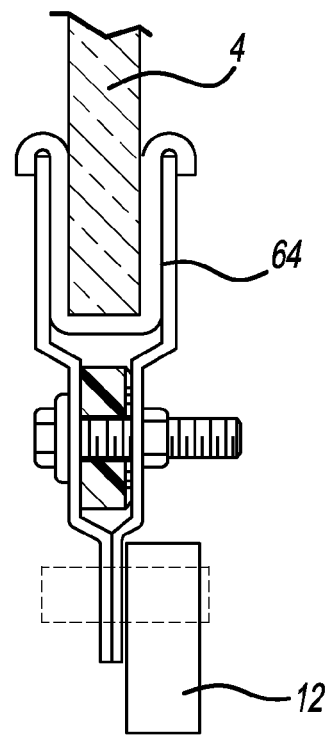
FIG. 8 shows a fourth embodiment of a window clamp suited for both the first and second embodiment of the widow regulator assembly in cross-sectional view VIII shown in FIG. 1.

The second window clamp 36 needs to withstand higher forces because this side needs a secure glass attachment in order to achieve sufficient rotational stability of the glass panel 4. Thus, the second window clamp 36 is preferably made of metal or at least reinforced with metal and may be a clamp 64 bolted onto the glass panel as shown in FIG. 7 or a clamp 64 secured via a tightening bolt as shown in FIG. 8.

Generally, the first window clamp 34 has the primary task of supporting the weight of the side window and does not need to be securely fastened to the glass panel 4. In contrast, the second window clamp secures the side window against vertical and lateral displacement relative to the second window clamp, either by a frictional force, or by a positive lock, or by a combination of the two.

While these types of window clamps 56, 58, 62, and 64 for glass attachment are generally known, it has been necessary in single-rail window regulators to safely secure both lateral sides of the carrier plate 12 to the glass panel. Simpler and cheaper clips 56 and 58 have in the past only been suited for dual rail window regulators.

Thus the laterally opposite attachments of the cable ends 40 and 42 to the carrier plate 12 allows for the use of less costly clips 56 and 58 on the side from which the cable 24 extends upward.

Generally, the other materials suited for window regulator assemblies 10 and 10' disclosed in this application are as follows: The first cable deflector 26 at the top of the guide rails 20 may have a bracket made of plastic inserted into the guide rail 20. Alternatively, the bracket may be made of steel welded or mechanically locked onto the guide rail 20. The drive unit 30 may have a plastic housing or alternatively a steel housing welded or mechanically locked to the guide rail. The guide rail 20 itself may be made of steel, aluminum, or plastic. In a particularly low-cost and low-labor arrangement, the upper bracket, the guide rail 20, and the drive unit housing near the bottom of the guide rail 20 may be manufactured as one monolithic stamped steel part or as a unitarily molded plastic part. The carrier plate 12 is made of plastic or steel.

While the above description constitutes the preferred embodiment of the present invention, it will be appreciated that the invention is susceptible to modification, variation and change without departing from the proper scope and fair meaning of the accompanying claims.

What is claimed is:
1. A window regulator assembly for moving a side window of a vehicle in an upward direction and in a downward direction along a rail axis, the window regulator comprising
a single guide rail defining the rail axis;
a carrier plate having a central guide structure for movably engaging the guide rail, a first lateral extension extending to a first lateral side of the guide rail, and a second lateral extension extending to a second lateral side of the guide rail opposite the first lateral side, the carrier plate having a first cable attachment pocket on the first lateral extension and a second cable attachment pocket on the second lateral extension;
a drive unit located adjacent to a bottom end of the single guide rail; and
a cable with a first cable end attached to the first cable attachment pocket and a second cable end attached to the second attachment pocket;
wherein the guide rail includes a cable channel forming a groove extending along the rail axis and having integral side walls, between which a guide structure of the carrier plate extends, the guide structure having two sidewalls unitary with the carrier plate and forming a groove there between, and an intermediate portion of the cable between the first cable end and the second cable end slidably resides inside the groove of the guide structure.

2. The window regulator assembly according to claim 1, wherein the first cable end extends in the upward direction from the carrier plate and the second cable end extends in the downward direction from the carrier plate.

3. The window regulator assembly according to claim 2, wherein the second lateral side of the carrier plate is configured to be located proximate to a longer vertical edge of the side window than the first lateral side of the guide rail.

4. The window regulator assembly according to claim 1, further comprising a first window clamp on the first lateral extension and a second window clamp on the second lateral extension, the first and second window clamps configured to engage with a lower portion of the side window.

5. The window regulator assembly according to claim 4, wherein the second window clamp provides a more secure engagement with the lower portion of the side window than the first window clamp against an upward movement of the glass panel relative to the carrier plate.

6. The window regulator assembly according to claim 5, wherein the first window clamp primarily supports the weight of the side window and the second window clamp secures the side window against vertical and lateral displacement relative to the second window clamp.

7. The window regulator assembly according to claim 1, wherein each of the first and second cable ends comprises an elastic tension adjuster element.

8. The window regulator assembly according to claim 1, wherein the cable extends in a first portion from the first lateral extension of the carrier plate upward to a first cable deflector, around the first cable deflector, from the first cable deflector in the intermediate portion downward along the cable channel in the guide rail to a second cable deflector, around the second cable deflector, and from the second cable deflector in a second section upward to the second lateral extension of the carrier plate, wherein the first, second, and intermediate portions of the cable extend parallel to one another.

9. The window regulator assembly according to claim 1, wherein the carrier plate includes side walls laterally narrowing the cable channel.

* * * * *